US006909711B1

United States Patent
Noguchi

(10) Patent No.: US 6,909,711 B1
(45) Date of Patent: Jun. 21, 2005

(54) VOICE GATEWAYS, ROUTE SELECTION METHOD OF THE SAME, AND MEMORY MEDIUM FOR STORING CONTROL PROGRAMS OF THE SAME

(75) Inventor: Sachiko Noguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/387,948

(22) Filed: Sep. 1, 1999

(30) Foreign Application Priority Data

Sep. 3, 1998 (JP) .......................................... 10-250092

(51) Int. Cl.⁷ .......................... H04L 12/66; H04L 12/28; H04L 12/56
(52) U.S. Cl. ....................... 370/356; 370/353; 370/354; 370/355; 370/401
(58) Field of Search ............................... 370/352–356, 370/400–401

(56) References Cited

U.S. PATENT DOCUMENTS 5,802,160 A  *  9/1998  Kugell et al. .......... 379/211.04
6,069,890 A  *  5/2000  White et al. ................. 370/352
6,130,881 A  * 10/2000  Stiller et al. ................. 370/238
6,157,648 A  * 12/2000  Voit et al. .................... 370/401
6,176,733 B1 *  1/2001  Coile et al. ................. 439/489
6,304,565 B1 * 10/2001  Ramamurthy ............... 370/352
6,324,279 B1 * 11/2001  Kalmanek, Jr. et al. ..... 379/229
6,389,005 B1 *  5/2002  Cruickshank ............... 370/352
6,452,922 B1 *  9/2002  Ho ............................. 370/352
6,584,093 B1 *  6/2003  Salama et al. .............. 370/351

FOREIGN PATENT DOCUMENTS

JP          05030319    *  2/1993    ............ H04N/1/32

* cited by examiner

Primary Examiner—Chi Pham
Assistant Examiner—Ronald Abelson
(74) Attorney, Agent, or Firm—Katten Muchin Zavis Rosenman

(57) ABSTRACT

A route selection method includes the steps of hierarchically dividing voice gateways, allocating necessary information for a route selection to the respective voice gateways, controlling an originating voice gateway to transmit a destination inquiring message to a destination voice gateway via other gateways, and controlling the destination voice gateway to transmit a destination determination message to the originating voice gateway.

21 Claims, 21 Drawing Sheets

FIG. 3

| DECLARATION TABLE (a) OF PARENT VOICE GATEWAY 60 | IP ADDRESS | PORT NUMBER |
|---|---|---|
| | 70.70.70.1 | 8001 |

| DECLARATION TABLE (b) OF PARENT VOICE GATEWAY 62 | IP ADDRESS | PORT NUMBER |
|---|---|---|
| | 20.20.20.1 | 8001 |

| DECLARATION TABLE (c) OF CHILD VOICE GATEWAY 64 | IP ADDRESS | PORT NUMBER |
|---|---|---|
| | 20.20.20.1 | 8001 |

| DECLARATION TABLE (d) OF CHILD VOICE GATEWAY 66 | IP ADDRESS | PORT NUMBER |
|---|---|---|
| | 70.70.70.1 | 8001 |

FIG. 4

ROUTE SELECTION TABLE (a)
OF PARENT VOICE GATEWAY 60

| STEERING NUMBER | TRANSPORT ADDRESS | |
|---|---|---|
| | IP ADDRESS | PORT NUMBER |
| 77 | 70.70.70.1 | 8001 |
| 722 | 20.20.20.2 | 8001 |

ROUTE SELECTION TABLE (b)
OF PARENT VOICE GATEWAY 62

| STEERING NUMBER | TRANSPORT ADDRESS | |
|---|---|---|
| | IP ADDRESS | PORT NUMBER |
| 72 | 20.20.20.1 | 8001 |
| 772 | 70.70.70.2 | 8001 |

FIG. 6

| DECLARATION HEADER | STEERING NUMBER : 722 | TRANSPORT ADDRESS (IP ADDRESS : 20.20.20.2, PORT NUMBER : 8001) |

FIG. 7

ROUTE SELECTION TABLE
OF CHILD VOICE GATEWAY 64

| STEERING NUMBER | TRANSPORT ADDRESS | |
|---|---|---|
| | IP ADDRESS | PORT NUMBER |
| 772 | 70.70.70.2 | 1720 |

FIG. 8

ROUTE SELECTION TABLE (a) OF PARENT VOICE GATEWAY 60

| STEERING NUMBER | TRANSPORT ADDRESS | | LAST ACCESS FIELD |
|---|---|---|---|
| | IP ADDRESS | PORT NUMBER | |
| 77 | 70.70.70.1 | 8001 | a/b/c d:e:f |
| 722 | 20.20.20.2 | 8001 | |

ROUTE SELECTION TABLE (b) OF PARENT VOICE GATEWAY 62

| STEERING NUMBER | TRANSPORT ADDRESS | | LAST ACCESS FIELD |
|---|---|---|---|
| | IP ADDRESS | PORT NUMBER | |
| 72 | 20.20.20.1 | 8001 | |
| 772 | 70.70.70.2 | 8001 | a/b/c d:e:f |

ROUTE SELECTION TABLE (c) OF CHILD VOICE GATEWAY 64

| STEERING NUMBER | TRANSPORT ADDRESS | | LAST ACCESS FIELD |
|---|---|---|---|
| | IP ADDRESS | PORT NUMBER | |
| 772 | 70.70.70.2 | 1720 | a/b/c d:e:f |

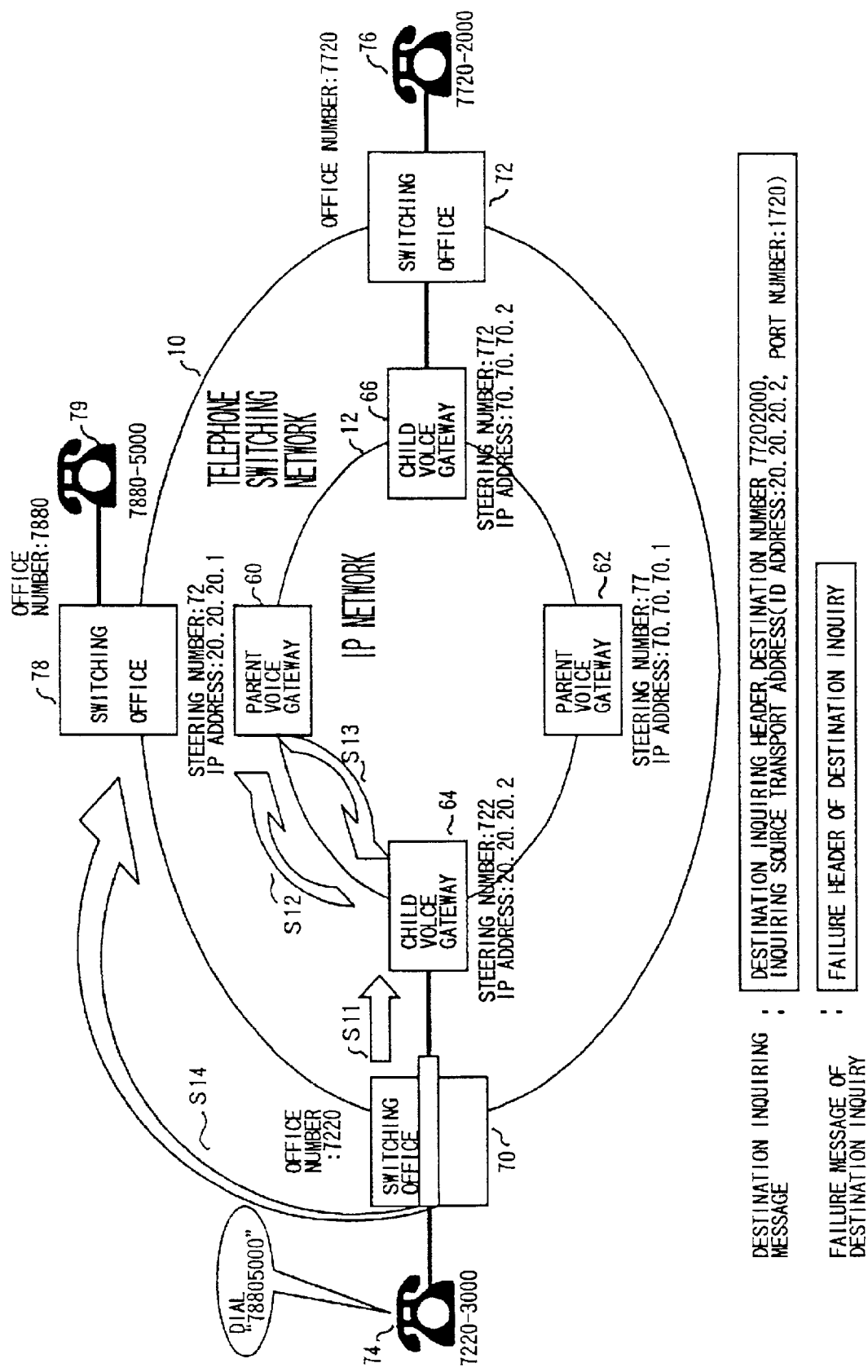

FIG. 19

TABLE (a)

| TRANSPORT ADDRESS | | UPDATE FLAG |
|---|---|---|
| IP ADDRESS | PORT NUMBER | |
| 20.20.20.2 | 8001 | FALSE |

TABLE (b)

| STEERING NUMBER | UPDATE FLAG |
|---|---|
| 721 | TRUE |

VOICE GATEWAYS, ROUTE SELECTION METHOD OF THE SAME, AND MEMORY MEDIUM FOR STORING CONTROL PROGRAMS OF THE SAME

BACKGROUND OF THE INVENTION

1. Field of the Invention

The present invention relates to voice gateways for setting up a call via an IP (Internet Protocol) network, and more particularly to a route selection method of the voice gateways for determining a destination for setting up the call.

2. Description of the Related Art

Conventionally, a call system via the IP network or the like can reduce communication costs by effectively making use of network bands. For this reason, a demand for utilizing long distance calls and the like of the call system via the IP network is high.

FIG. 1 illustrates an example of a conventional route selection method.

In this diagram, a telephone switching network 10 and an IP network 12 are connected via voice gateways $20_1$ to $20_n$, each having an office number indicating a location in the telephone switching network 10 and a transport address indicating a location in the IP network 12. Telephone terminals $50_1$ to $50_p$ connected to the telephone switching network 10 or telephone terminals $40_1$ to $40_n$ respectively connected to the voice gateways $20_1$ to $20_n$ can communicate with each other via the telephone switching network 10 or the IP network 12. An address determination server 30 will be described later.

In a case where the telephone terminal $40_1$ calls the telephone terminal $40_m$ via the IP network 12, the telephone terminal $40_1$ sends to the voice gateway $20_1$ a telephone number of the telephone terminal $40_m$ as a destination, and the voice gateway $20_1$ then determines a transport address after receiving the telephone number of the telephone terminal $40_m$. The transport address indicates a location of the voice gateway $20_n$ as a destination for setting up the call in the IP network 12. Thus, the voice gateway $20_1$ sends out a call-setup signal towards the transport address, and if the call is set up, then a communication (talk) is started between the telephone terminal $40_1$ and the telephone terminal $40_m$.

Conventionally, there are two methods for the voice gateway $20_1$ to determine the transport address of the destination voice gateway $20_n$ for setting up the call according to the telephone number of the destination telephone terminal $40_m$.

In the first method, the voice gateways $20_1$ to $20_n$ each hold a table in which are recorded office numbers and corresponding transport addresses of all of the voice gateways $20_1$ to $20_n$ existing in the IP network 12. In the call setup, the transport address of the destination voice gateway is determined by referring to the table.

In the second method, the IP network is provided with the address determination server 30 having the table described in the first method. In the call setup, the transport address of the destination voice gateway is determined by inquiring of the address determination server 30.

However, the above-described two methods have the following disadvantages.

With respect to the first method, each voice gateway has the table in which are recorded the office numbers and the corresponding transport addresses of all of the voice gateways $20_1$ to $20_n$ existing in the IP network 12. For this reason, when an office number or a transport address of one voice gateway is changed due to the voice gateway being moved, the tables of all the other voice gateways must be changed. This brings about a problem of maintenance management.

With respect to the second method, whenever a call is generated, traffic is generated between the respective voice gateways $20_1$ to $20_n$ and the address determination server 30. For this reason, a load on the address determination server 30 is too heavy. That is, inquiries from a plurality of the voice gateways are concentrated on the one address determination server 30. This brings about the address determination server 30 operating late or congestion occurring at a point of connecting the address determination server 30 and the IP network 12. Moreover, even if a plurality of such address determination servers are disposed to disperse the traffic, as a result, costs go up and the problems of the above-described first method occur.

SUMMARY OF THE INVENTION

It is a general object of the present invention to provide voice gateways, a route selection method of the voice gateways, and a memory medium for storing control programs of the voice gateways, in which the above disadvantages are eliminated.

A more specific object of the present invention is to provide voice gateways, a route selection method of, the voice gateways, and a memory medium for storing, control programs of the voice gateways, in which, when performing a route selection for setting up a call, each of the voice gateways can avoid traffic congestion by transmitting information about the route selection to determine a route, and can make maintenance management easy by automatically updating the information about the route selection.

The above objects of the present invention are achieved by a route selection method for a voice system, which system comprises:

a plurality of networks including IP networks; and a plurality of voice gateways interconnecting said IP networks with the other networks for voice communication, the voice gateways being hierarchically divided into first voice gateways for accommodating nodes of the networks other than the IP networks, and second voice gateways for delivering information about the route selection;

the method comprising the steps of:

(a) controlling the second voice gateways to hold a route selection table indicating a correspondence between steering numbers and transport addresses for identifying routes on the IP network;

(b) controlling one of the first voice gateways as an originating voice gateway to transmit a destination inquiring message, including a transport address of the originating voice gateway and a destination office number, to a predetermined one of the second voice gateways in which the destination inquiring message is collated with the route selection table thereof and is forwarded towards one of the first voice gateways as a destination voice gateway; and (c) controlling the destination voice gateway to transmit a destination determination message including a transport address of the destination voice gateway to the originating voice gateway.

The above described step (a) may further includes a step of controlling the voice gateway, in a predetermined case, to transmit a steering number and a transport address thereof to the second voice gateway.

The above route selection method may further comprise a step of:

(d) controlling the originating voice gateway, after receiving the destination determination message, to record a destination transport address and a destination steering number, which are included in the destination determination message, in a route selection table thereof, the route selection table indicating a correspondence between the destination transport address and the destination steering number.

The above route selection method may further comprise a step of:

(e) controlling the originating voice gateway, after receiving the destination determination message, to refer to traffic between the originating voice gateway and the destination voice gateway, and then only when the traffic meets a predetermined traffic requirement, record a destination transport address and a destination steering number which are included in the destination determination message in a route selection table thereof, the route selection table indicating a correspondence between the destination transport address and the destination steering number.

The above route selection method may further comprise a step of:

(f) controlling the originating voice gateway, in a case of failing to set up a call towards the transport address recorded in the route selection table thereof, to transmit the destination inquiring message to the predetermined second voice gateway.

The above route selection method may further comprise a step of:

(g) deleting the transport address and the steering number from the route selection table, if the transport address recorded on the route selection table is not referred to during a predetermined period.

The above route selection method may further comprise a step of:

(h) controlling the second voice gateway, in a case of failing to deliver the route selection information, to transmit a failure message to the originating voice gateway, so that the originating voice gateway selects the network other than the IP networks to set up the call.

The above route selection method may further comprise a step of:

(i) notifying the second voice gateway, when the steering number or the transport address of the voice gateway is changed, of the changed steering number or the changed transport address.

The above objects of the present invention can be achieved by a voice gateway interconnecting IP networks with other networks for voice communication, the voice gateway comprising:

a call-setup part which, after detecting a call-setup request from one of the other networks, transmits a destination inquiring message to a predetermined voice gateway, and, after receiving a destination determination message from a destination voice gateway performs a call setup towards a destination transport address included in the destination determination message from the destination voice gateway.

The above voice gateway may further comprise a transmitting part which, in a predetermined case, transmits a steering number and a transport address of the voice gateway to the predetermined voice gateway.

The above voice gateway may further comprise a recording part which records the destination transport address and a destination steering number of the destination voice gateway, which are included in the destination determination message, in a route selection table thereof, the route selection table indicating a correspondence between the destination transport address and the destination steering number of the destination voice gateway.

The above voice gateway may further comprise a recording part which, after receiving the destination determination message from the destination voice gateway, refers to traffic between the voice gateway and the destination voice gateway, and, only when the traffic meets a predetermined traffic requirement, records the destination transport address and a destination steering number of the destination voice gateway in a route selection table thereof, the route selection table indicating a correspondence between the destination transport address and the destination steering number of the destination voice gateway.

The above voice gateway may be configured such that the call-setup part comprises:

a quick-call-setup part, which after detecting the call-setup request, refers to the route selection table so as to obtain the destination transport address, and then performs the call setup towards the destination transport address; and a transmitting part which, in a case of the quick-call-setup part failing to perform the call setup towards the destination transport address, transmits the destination inquiring message to the predetermined voice gateway.

The above voice gateway may further comprise a deleting part which deletes the destination transport address and the corresponding destination steering number from the route selection table if the destination transport address recorded on the route selection table is not referred to during a predetermined period.

The above voice gateway may further comprise:

a receiving part which receives a failure message in a case where the destination inquiring message has been transmitted to the predetermined voice gateway but the destination cannot be detected; and an alternate-call-setup part which selects a network other than one of the IP networks to perform the call setup when the failure message is received.

The above voice gateway may further comprise a notifying part which, when the steering number and the transport address of the voice gateway are changed, notifies the predetermined voice gateway of the changed steering number and the changed transport address.

The above objects of the present invention can be achieved by a voice gateway interconnecting IP networks and other networks for voice communication, the voice gateway comprising:

a transmitting part which, after receiving a destination inquiring message, refers to a route selection table thereof, which route selection table indicates a correspondence between steering numbers and transport addresses, and then transmits the destination inquiring message towards a transport address obtained by referring to the route selection table.

The above voice gateway may further comprise:

a transmitting part which, in a predetermined case, transmits a steering number and a transport address to a predetermined voice gateway; and a recording part which, after receiving a steering number and a transport address from another voice gateway in the predetermined case, records the received steering number and the received transport address in the route selection table thereof.

The above voice gateway may further comprise a deleting part which deletes the transport address and the corresponding steering number from the route selection table if the transport address recorded in the route selection table is not referred to during a predetermined period.

The above voice gateway may further comprise a failure-message transmitting part which transmits a failure message to an originating voice gateway which has transmitted the destination inquiring message, in a case where the destination cannot be detected even though the destination inquiring message has been received and the route selection table has been referred to.

The above voice gateway may further comprise:

a notifying part which, when the steering number and the transport address are changed, notifies a predetermined voice gateway of the changed steering number and the changed transport address; and a recording part which receives a steering number and a transport address from another voice gateway and records the steering number and the transport address in the route selection table.

The above objects of the present invention can be achieved by a computer readable medium storing program code for controlling a voice gateway interconnecting IP networks and other networks for voice communication, the computer readable medium comprising:

program code means for, after the voice gateway detects a call-setup request from one of the other networks, controlling the voice gateway to transmit a destination inquiring message to a predetermined voice gateway, and after the voice gateway receives a destination determination message, controlling the voice gateway to perform a call setup towards a destination transport address included in the destination determination message.

The above objects of the present invention can be achieved by a computer readable medium storing program code for controlling a voice gateway interconnecting IP networks and other networks for voice communication, the computer readable medium comprising:

program code means for, after the voice gateway receives a destination inquiring message, controlling the voice gateway to refer to a route selection table indicating a correspondence between steering numbers and transport addresses, and then transmit the destination inquiring message towards a transport address obtained by referring to the route selection table.

The above objects of the present invention can be achieved by a route selection method for voice gateways which are hierarchically divided into first voice gateways for accommodating nodes of networks other than IP networks, and second voice gateways for transferring information about a route selection, the method comprising the steps of:

(a) controlling each of the second voice gateways to hold a route selection table indicating a correspondence between steering numbers and transport addresses for identifying routes on the IP network;

(b) controlling one of the first voice gateways as an originating voice gateway to transmit a destination inquiring message, including a transport address of the originating voice gateway and a destination office number, to a predetermined one of the second voice gateways in which the destination inquiring message is collated with the route selection table thereof and is forwarded towards one of the first voice gateways as a destination voice gateway; and (c) controlling the destination voice gateway to transmit a destination determination message including a transport address of the destination voice gateway to the originating voice gateway.

BRIEF DESCRIPTION OF THE DRAWINGS

Other objects, features and advantages of the present invention will become more apparent from the following detailed description when read in conjunction with the accompanying drawings, in which:

FIG. 3 shows declaration tables (a), (b), and (c) of the voice gateways according to the embodiment of the present invention shown by FIG. 2;

FIG. 4 shows route selection tables (a) and (b) of parent voice gateways according to the embodiment of the present invention shown by FIG. 2;

FIG. 6 shows a declaration message transmitted by a child voice gateway 64 according to the embodiment of the present invention shown by FIG. 2;

FIG. 7 shows a route selection table of the child voice gateway 64 after transmitting a destination inquiring message toward a telephone terminal 76 according to the embodiment of the present invention shown by FIG. 2;

FIG. 8 shows route selection tables (a), (b) and (c), each including a last access field, of the voice gateways 60, 62, and 64 according to the embodiment of the present invention shown by FIG. 2;

FIG. 9 is a network diagram illustrating how a message for performing a call setup flows in a case of failing to detect a destination according to the embodiment of the present invention shown by FIG. 2;

FIG. 19 shows tables (a) and (b) of the child voice gateway 64, each including an update flag, according to the embodiment of the present invention shown by FIG. 2;

DETAILED DESCRIPTION OF THE PREFERRED EMBODIMENTS

Figure 1:
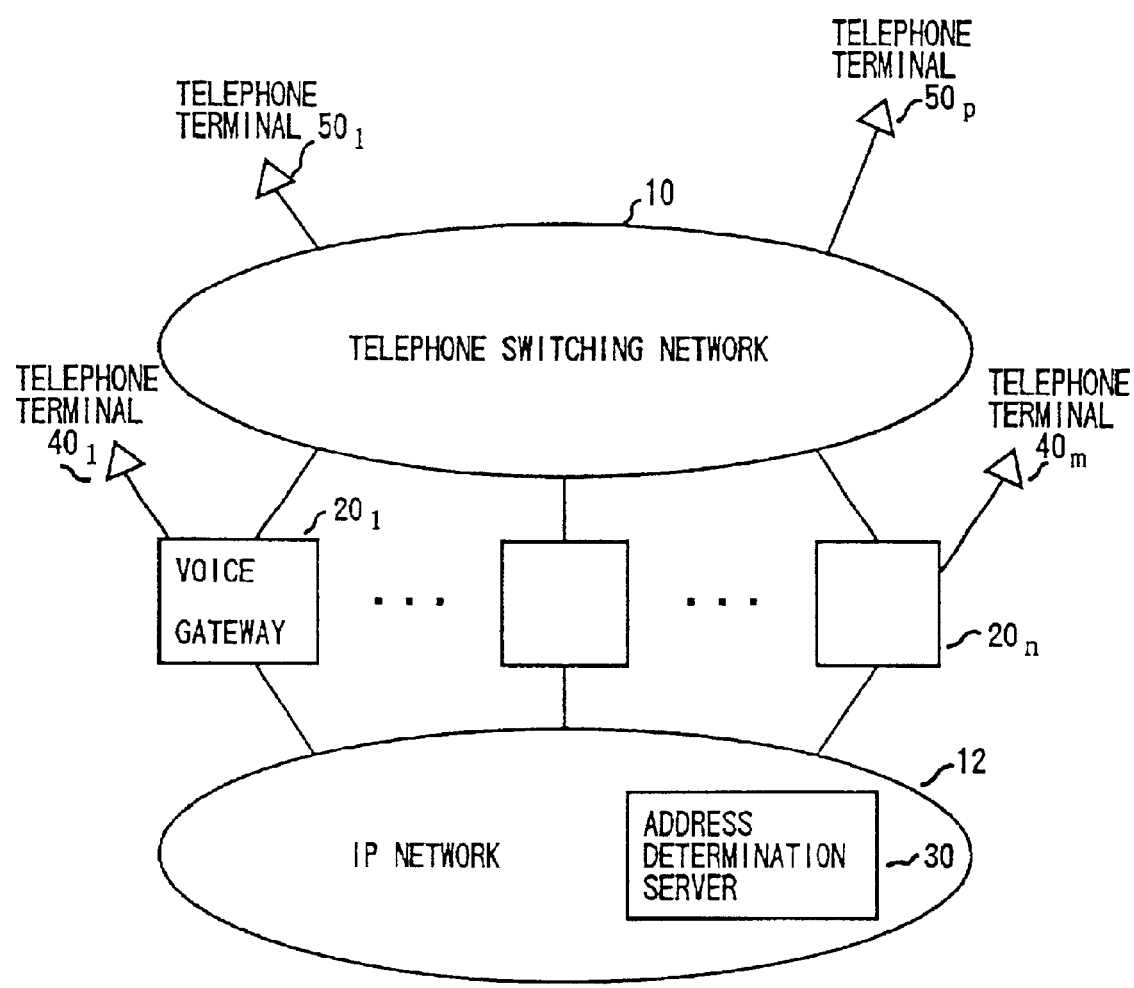
FIG. 1 is a network diagram illustrating a conventional route selection method of voice gateways.
Figure 2:
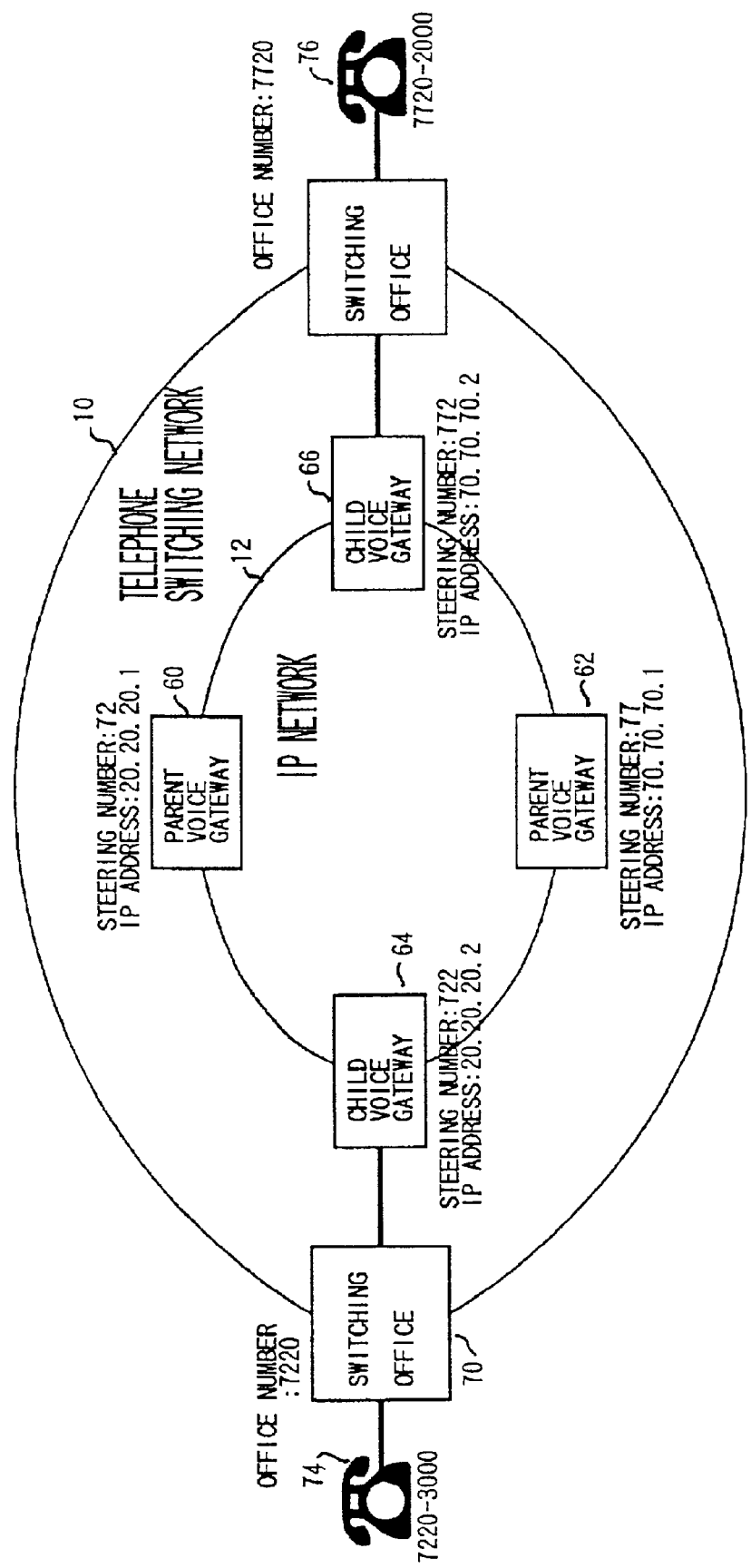
FIG. 2 is a network diagram illustrating a route selection method of voice gateways according to an embodiment of the present invention.

FIG. 2 is a diagram of a network consisting of a telephone switching network 10 and an IP network 12.

In this diagram, the telephone switching network 10 is provided with two telephone switching offices 70 and 72 to which telephone terminals 74 and 76 are respectively connected. The IP network 12 is provided with voice gateways 60, 62, 64 and 66, each having a conversion function of transferring voices between the telephone switching network.10 and the IP network 12. The voice gateways 64 and 66 are respectively connected to the telephone switching offices 70 and 72.

Herein, the voice gateways 64 and 66 which are respectively connected to the telephone switching offices 70 and 72 are referred to as child voice gateways, and the voice gateways 60 and 62 which are not connected to any telephone switching offices are referred to as parent voice gateways. Further, in the claims, the child voice gateways 64, 66 correspond to first voice gateways and the parent voice gateways 60, 62 correspond to second voice gateways.

The switching office 70 is allocated an office number "7220" and the telephone terminal 74 is allocated a telephone number "7220-3000". The switching office 72 is allocated an office number "7720" and the telephone terminal 76 is allocated a telephone number "7720-2000". Each of the previously described voice gateways is allocated a steering number (digits) and an IP address.

Herein, the steering number is a predetermined number which represents a part of the office number of the switching office and is used to transfer a destination inquiring message. The IP address indicates a location in the IP network 12.

In this embodiment, the child voice gateway 64 is allocated a steering number 722 and an IP address 20. 20. 20. 2. The child voice gateway 66 is allocated a steering number 772 and an IP address 70. 70. 70. 2. The parent voice gateway 60 is allocated a steering number 72 and an IP address 20. 20. 20. 1. The parent voice gateway 62 Is allocated a steering number 77 and an IP address 70. 70. 70. 1.

The voice gateways 60, 62, 64 and 66, as shown in FIG. 3, have their respective declaration tables (a), (b), (c) and (d) which are respectively stored in memory units of these gateways. The declaration table (a) of the parent voice gateway 60 consists of an IP address and a port number for identifying an application, and indicates a location to which the parent voice gateway 60 transmits information about a route selection in a predetermined case (to be described later). The tables (b), (c) and (d) of the other voice gateways 62, 64 and 68 have the same structure as the table (a) of the voice gateway 60, and a description thereof is omitted.

Hereinafter, the IP address and the port number are combined into one transport address. Further, the parent voice gateways 60 and 62, as shown in FIG. 4, have their respective route selection tables (a) and (b), each including steering numbers and the transport addresses respectively corresponding to the steering numbers.

A description will now be given of a route selection method of the voice gateways in a case where the telephone terminal 74 calls the telephone terminal 76, by referring to FIG. 5.

Figure 5:
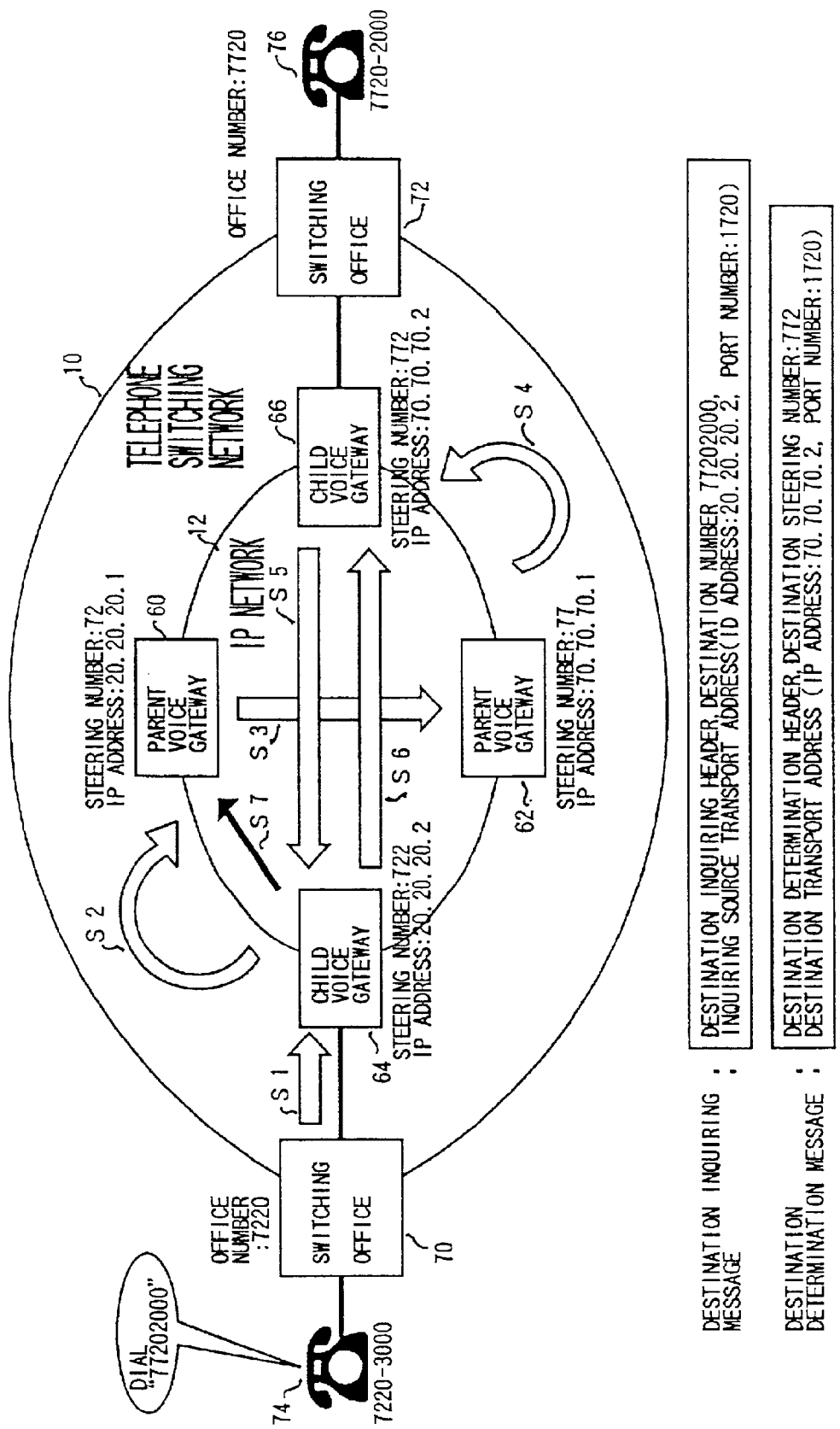
FIG. 5 is a network diagram illustrating how a message for a call setup flows according to the embodiment of the present invention shown by FIG. 2.

A network of FIG. 5 has the identical construction with that of FIG. 2. When the telephone terminal 74 dials the telephone number "77202000" of the telephone terminal 76, then the switching office 70 transmits a start signal and the number "77202000" to the child voice gateway 64.

After receiving the start signal and the number "77202000" (step S1), the child voice gateway 64 transmits a destination inquiring message (see FIG. 5) to an IP address 20. 20. 20. 1 recorded in the declaration table (c) of the child voice gateway 64 (see FIG. 3), that is, to the parent voice gateway 60 (step S2). As shown in FIG. 5, the destination inquiring message consists of a destination inquiring header, a destination number, and a transport address of the inquiring source (the child voice gateway 64).

After receiving the destination inquiring message (step S2), the parent voice gateway 60 collates the destination number "77202000" with the steering number of the route selection table (a) of FIG. 4. Since the two head digits "77" of the destination number "77202000" are consistent with the steering number "77" of the route selection table (a), the transport address (IP address: 70. 70. 70. 1, port number: 8001) is selected. Hence, the parent voice gateway 60 transmits the destination inquiring message to the selected transport address, namely, the parent voice gateway 62.

After receiving the destination inquiring message (step S3), the parent voice gateway 62 collates the destination number "7202000" of the destination inquiring message with the steering number of the route selection table (b) of FIG. 4. Since the three head digits "772" of the destination number "77202000" are consistent with the steering number "772" of the route selection table (b), the transport address (IP address: 70. 70. 70. 2, port number: 8001) is selected. Hence, the parent voice gateway 62 transmits the destination inquiring message to the selected transport address, namely, the child voice gateway 66 (step S4).

After receiving the destination inquiring message (step S4), the child voice gateway 66 confirms that the steering number "772" thereof is consistent with the three head digits "772" of the destination number "77202000" of the destination inquiring message, and then transmits a destination determination message to the source transport address (IP address: 20. 20. 20. 2, port number: 8002) as shown in FIG. 5), that is, back to the child voice gateway 64 (step S5). The destination determination message of FIG. 5 consists of an destination determination header, a destination steering number: 772, and a destination transport address (IP address: 70. 70. 70. 2, port number: 1720). Herein, the port number 1720 denotes an application.

After receiving the destination determination message (step S5), the child voice gateway 64 sets up a call towards the destination transport address (IP address: 70. 70. 70. 2, port number: 1720) included in the destination determination message, that is, towards the child voice gateway 66 (step S6).

Now, a description will be given of how the route selection tables of the parent voice gateways are developed.

Each voice gateway, in a case of being newly disposed or being system-reset (the above-mentioned predetermined case), refers to the declaration table thereof shown in FIG. 3, and then transmits a declaration message (including a declaration header, a transmission source steering number, and a transmission source transport address) to a declaration destination transport address. After receiving the declaration message, each parent voice gateway records data of the declaration message in the route selection table thereof.

FIG. 6 shows an example of delivering the above-described declaration message. In a case of being newly disposed or being system-reset, the child voice gateway 64 refers to the declaration table (c) shown in FIG. 3 and then transmits a declaration message (including the declaration header, the transmission source steering number 722, and the transmission source transport address (IP address: 20. 20. 20. 2, port number: 8001) to the transport address (IP address: 20. 20. 20. 1, port number: 8001), that is, to the parent voice gateway 60 (step S7 of FIG. 5). After receiving the declaration message (step S7), the parent voice gateway 60 records the declaration message in the route selection table (a) thereof shown in FIG. 4.

Next, a description will be given of how the route selection tables of the child voice gateways are developed according to the previously described embodiment.

After receiving the destination determination message (step S5 of FIG. 5), the child voice gateway 64 records the destination steering number 772 and the destination transport address (IP address: 70. 70. 70. 2, port number: 1720), which are included in the destination determination message, in the route selection table stored in the memory unit thereof. FIG. 7 shows the route selection table of the child voice gateway 64.

It should be noted that only in a case where traffic between the destination child voice gateway 66 and the source child voice gateway 64 is heavier than a predetermined value is the method of recording the information in the route selection table employed.

A description will now be given of a case where the child voice gateway 64 has been supplied with the route selection table, by referring to FIG. 5.

When the telephone terminal 74 dials the telephone number "77202000" of the telephone terminal 76, the switching office 70 transmits a start signal to the child voice gateway 64 (step S1). After receiving the start signal and the dial number "77202000", the child voice gateway 64 refers to the route selection table shown in FIG. 7 and then sets up a call towards the transport address (IP address: 70. 70. 70. 2, port number: 1720) corresponding to the steering number 772. In this case, the steps (S2 to S5) of inquiring the destination are not carried out.

According to the above, a description will now be given of a case where the steering number "772" of the route selection table shown in FIG. 7 cannot be detected.

If the dial number is not "77202000" but is "77502000", then the child voice gateway 64 cannot detect the steering number "772" of the route selection table of FIG. 7. In this case, the call setup is carried out in an order of steps S2 to S6.

In a case where the transport address of the child voice gateway 66 is changed due to the child voice gateway 66 being moved, the child voice gateway 64 receives the start signal and the dial number "77202000" (step S1), and then refers to the route selection table of FIG. 7 so as to start a call setup. However, since the destination transport address (IP address: 70. 70. 70. 2, port number: 1720) is no longer there, the child voice gateway 64 stops setting up the call and then transmits the destination inquiring message to the parent voice gateway 60, so that the call setup is performed according to the steps of S2 to S6.

Also, if the transport addresses respectively included in the route selection tables of the child voice gateways and the parent voice gateways are not referred to during a predetermined period, the transport addresses and the corresponding steering numbers are automatically deleted from the route selection tables. Hence, the respective route selection tables are kept from holding needless data. For example, if the transport address (IP address: 20. 20. 20. 2, port number: 8001) of the route selection table (a) of the parent voice gateway 60 shown in FIG. 4 is not referred to during the predetermined period, then the steering number 722 and the transport address (IP address: 20. 20. 20. 2, port number: 8001) are deleted from the route selection table (a).

A more detailed description thereof will now be given as follows.

Referring to FIG. 5, in a case where the telephone terminal 74 dials "77202000" at a date and time of "a" year, "b" month, "c" day, "d" hour, "e" minute and "f" second, at this date and time, after detecting the transport address (IP address: 70. 70. 70. 1, port number: 8001) according to a coincidence of the steering number "77" with the two head digits "77" of the dialed number "77202000", the parent voice gateway 60 records a timestamp indicating the detection date and time on a last access field of a table (a) shown in FIG. 8. Similarly, in a table (b) of FIG. 8 the parent voice gateway 62 records such a timestamp on a last access field corresponding to the transport address (IP address: 70. 70. 70. 2, port number: 8001).

An example with respect to the child voice gateway will now be given as follows.

In FIG. 2, in a case where the telephone terminal 74 dials the number "77202000" at a date and time of "a" year, "b" month, "c" day, "d" hour, "e" minute and "f" second, at this date and time, after detecting the transport address (IP address: 70. 70. 70. 2, port number: 1720) according to a coincidence of the steering number "772" with the three head digits "772" of the dialed number "77202000", the child voice gateway 64 records the timestamp indicating the detection date and time on a last access field of a table (c) shown in FIG. 8.

Additionally, a description will now be given of a case where the parent voice gateway does not detect a transport address of the destination in the route selection table when transferring the destination inquiring message, by referring to FIG. 9 .

A constitution shown by FIG. 9 is provided with a switching office 78 and a telephone terminal 79 connected to the switching office 78 in addition to the constitution shown by FIG. 2. The switching office 78 is allocated an office number "7880" and the telephone terminal 79 is allocated a telephone number "7880-5000".

In FIG. 9, after the telephone terminal 74 dials the number "78805000" of the telephone terminal 79, the switching office 70 analyzes the dial number "78805000" so as to determine a route to the child voice gateway 64, and then sends a start signal and the dial number "78805000" to the child voice gateway 64 (step S11). After receiving the start signal and the dial number "78805000" (step S11), the child voice gateway 64 transmits a destination inquiring message to the parent voice gateway 60, information of the parent voice gateway 60 being recorded on the declaration table (c) of the child voice gateway 64 shown in FIG. 3 (step S12). The parent voice gateway 60 refers to the route selection table (a) of FIG. 4 so as to detect a transport address corresponding to the dial number "78805000". However, since such a transport address does not exist in the route selection table (a) of FIG. 4, the parent voice gateway 60 transmits a failure destination inquiring message, including only a destination inquiring header, to the child voice gateway 64 as the transmission source of the destination inquiring message (step S13).

After receiving the failure destination inquiring message, the child voice gateway 64 starts a call setup again towards the telephone switching network 10 (step S14).

Next, a description will be given of a case where the transport address or the steering number of each voice gateway is changed.

For example, when the steering number stored in the memory unit of the child voice gateway 64 is changed by a system operator from "722" to "721", the child voice gateway 64 refers to the declaration table (c) shown in FIG. 3 and then transmits a declaration message (including the declaration header, the steering number 721, and the transport address (IP address: 20. 20. 20. 2, port number: 8001)) to the declaration transport address (IP address: 20. 20. 20. 1, port number: 8001). The transmission route is the same as that of S7 shown in FIG. 5. After receiving the declaration message, the parent voice gateway 60 changes the steering number "722" of the route selection table (a) shown in FIG. 4 into "721". Similarly, in a case where the transport address or the steering number of each of the other voice gateways is changed, such a declaration message is transmitted to the parent voice gateway recorded in the declaration table.

Next, a description will be given of constitutions and operations of the voice gateways 64 and 66 in the previously described embodiment shown in FIG. 2.

Figure 10:
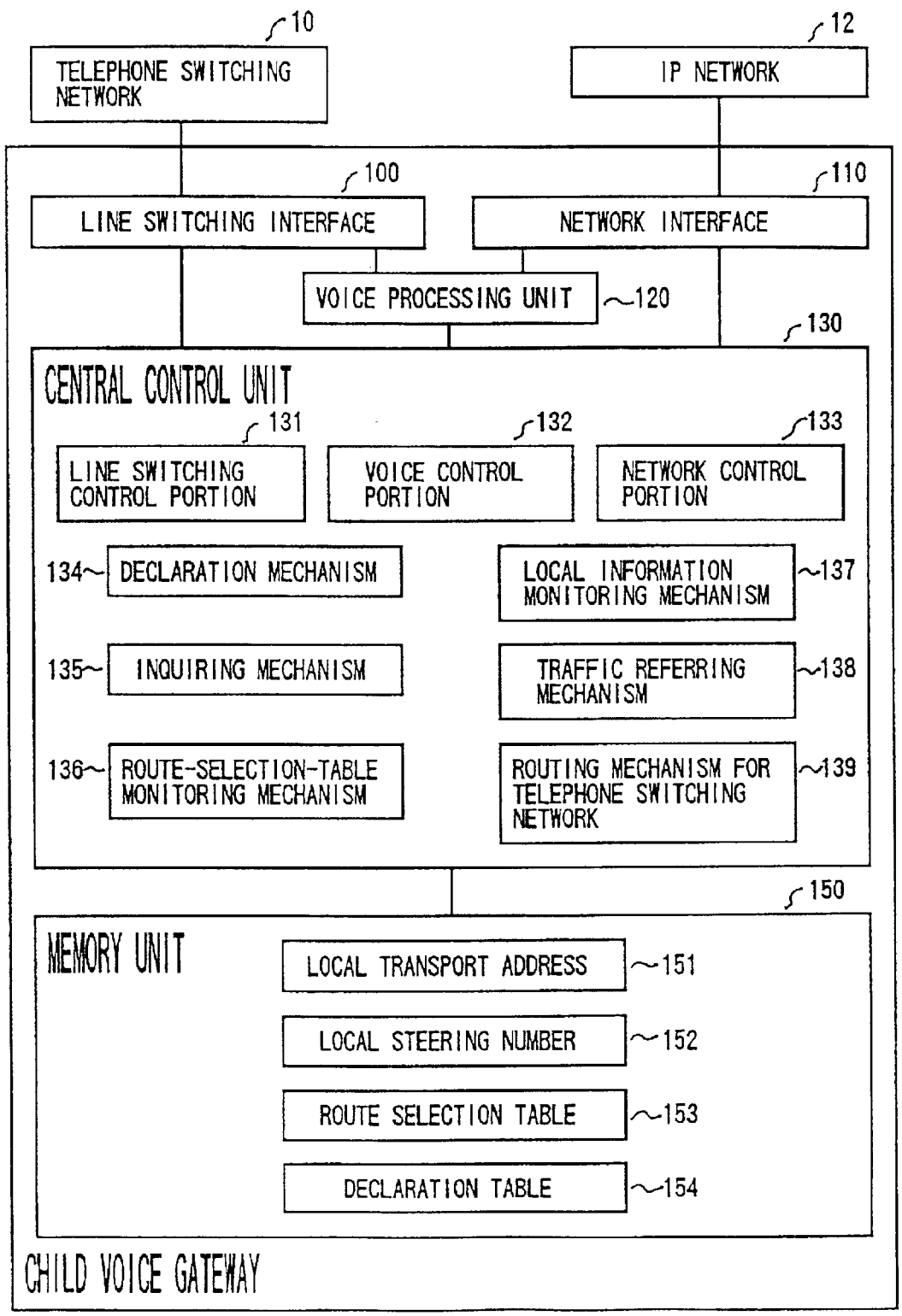
FIG. 10 is a block diagram of the child voice gateway according to the embodiment of the present invention shown by FIG. 2.

Firstly, FIG. 10 is a block diagram illustrating the constitutions of the child voice gateways 64 and 66. As shown in this diagram, the child voice gateways 64 and 66 each comprise a central control unit 130, a memory unit 150, a voice processing unit 120, a line switching interface 100, and a network interface 110. Herein, the central control unit 130 is connected to the memory unit 150, the voice processing unit 120, the line switching interface 100 and the network interface 110. The line switching interface 100 and the network interface 110 are connected to the voice processing unit 120. The line switching interface 100 is connected to the telephone switching network 10. The network interface 110 is connected to the IP network 12.

Figure 12:
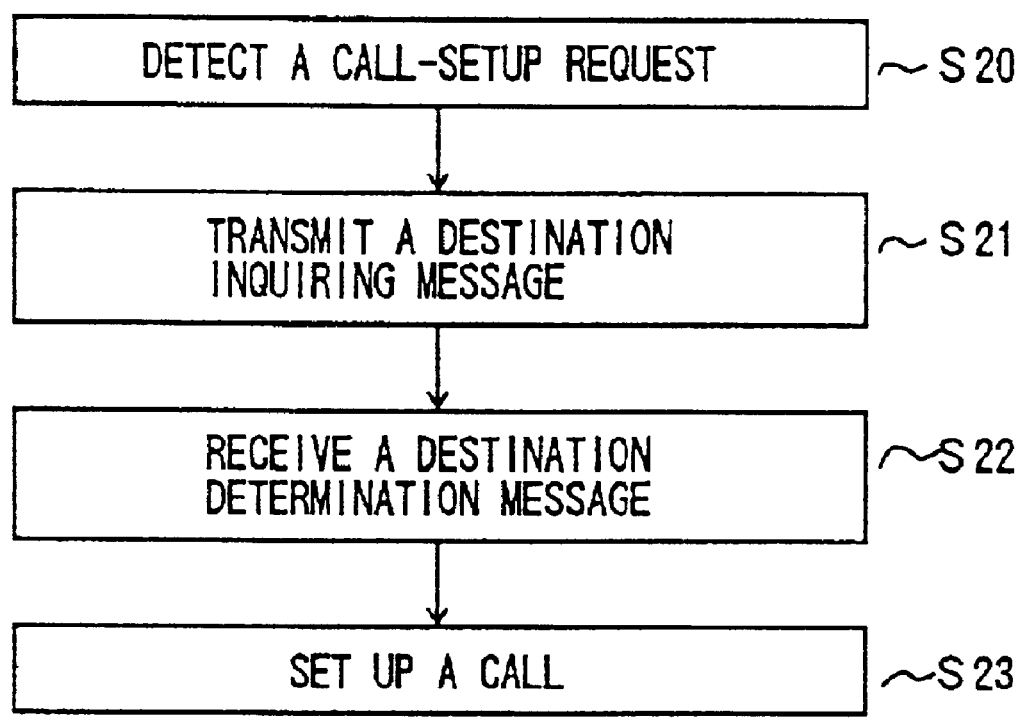
FIG. 12 is a flowchart of operations of the child voice gateway to transmit a destination inquiring message according to the embodiment of the present invention shown by FIG. 2.

Secondly, the operations of the child voice gateways 64 and 66 flow as shown in FIG. 12. FIG. 12 is a flowchart of the operations of the child voice gateway to transmit the destination inquiring message according to a call-setup request from a telephone switching office. After detecting the call-setup request from the telephone switching office (step S20), the child voice gateway refers to the declaration table thereof and then sends out the destination inquiring message (step S21). After receiving a destination determination message (step S22), the child voice gateway performs the call setup towards the destination (step S23).

Figure 13:
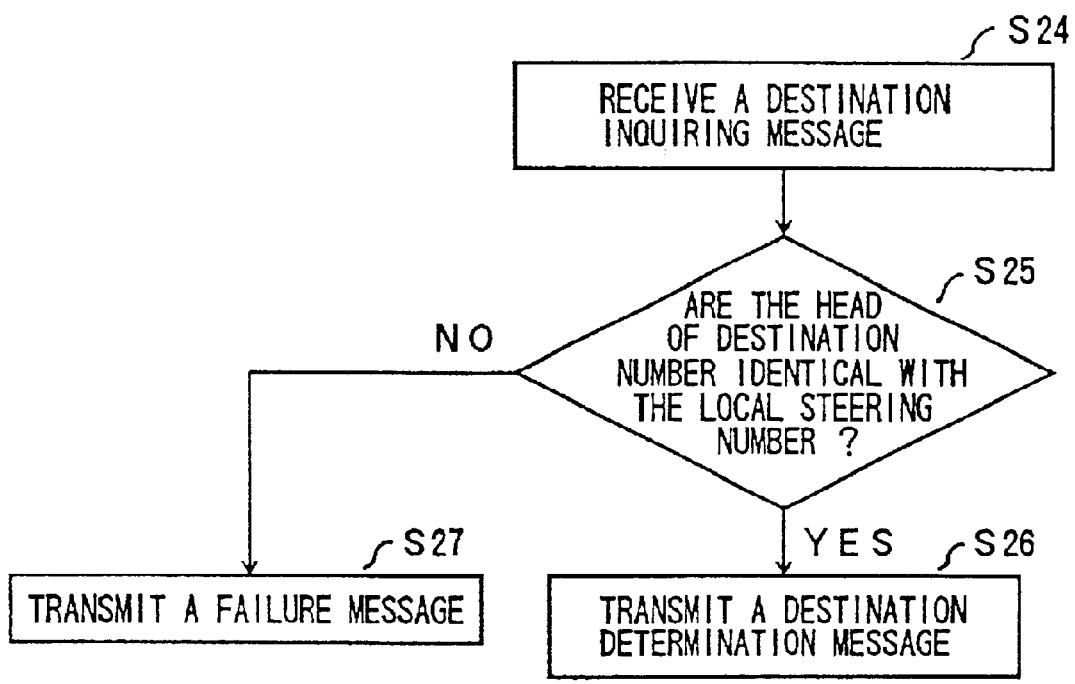
FIG. 13 is a flowchart of operations of the child voice gateway to receive the destination inquiring message according to the embodiment of the present invention shown by FIG. 2.

FIG. 13 is a flowchart of the operations of the destination child voice gateway. After receiving the destination inquiring message (step S24), the destination child voice gateway confirms whether or not the local steering number is identical with the head digits of the destination number (step S25). If it is identical, then the destination child voice gateway transmits a destination determination message to the source child voice gateway (step S26). If not identical, then the destination child voice gateway sends out a failure message (step S27). The above-described operations are performed by an inquiring mechanism 135 and a declaration mechanism 134 of the central control unit 130.

Also, the declaration mechanism 134 of the central control unit 130 shown in FIG. 10 functions to declare a local transport address 151 or a local steering number 152 to other parent voice gateways (step S7 of FIG. 5).

Figure 14:
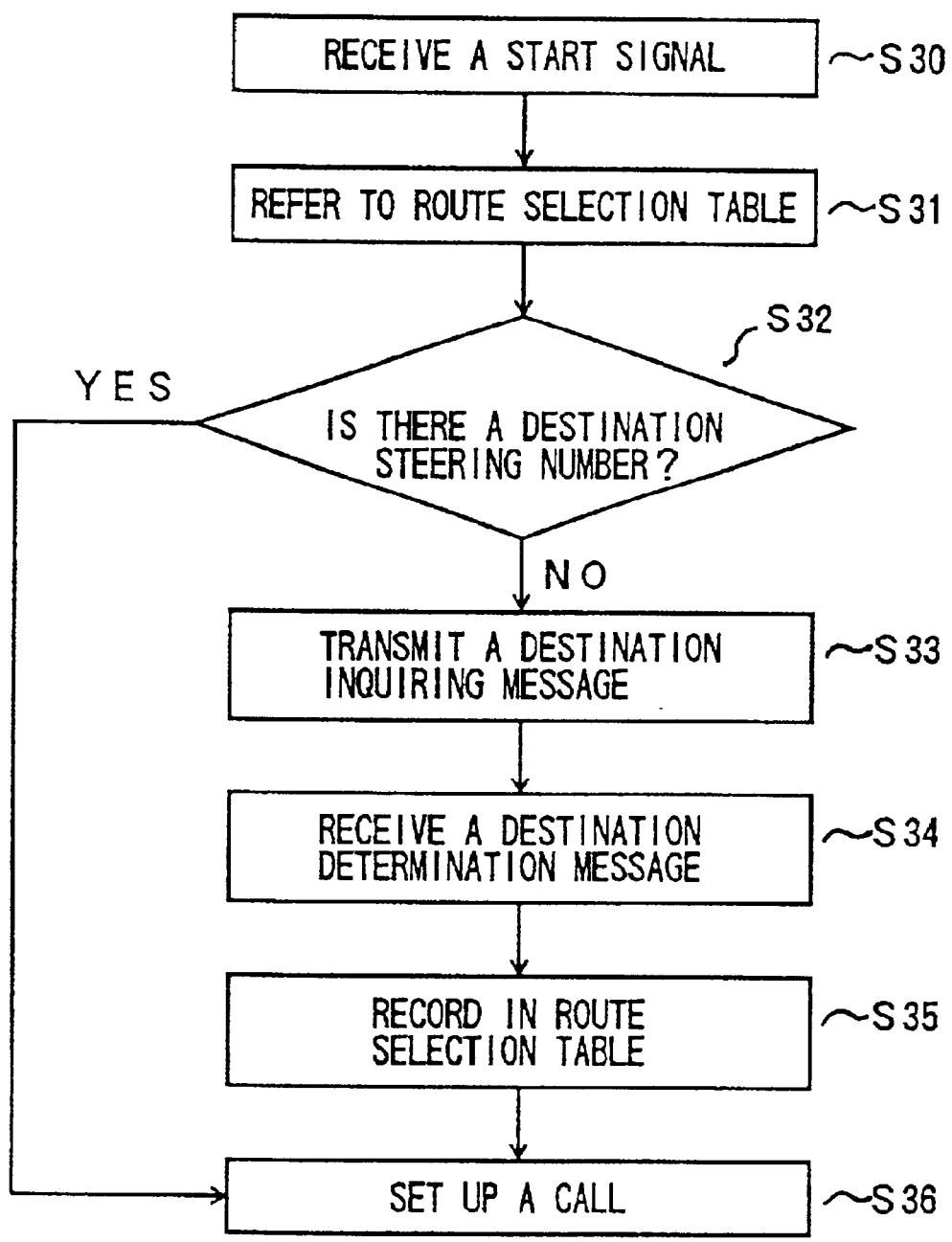
FIG. 14 is a flowchart of operations of the child voice gateway in a case of performing a call setup by using the route selection table thereof according to the embodiment of the present invention shown by FIG. 2.

FIG. 14 is a flowchart of the operations of the child voice gateway to transmit the destination inquiring message according to a route selection table 153.

After receiving a start signal (step S30), the child voice gateway refers to the route selection table 153 (step S31) and then confirms whether or not the destination steering number is recorded in the route selection table 153 (step S32). If it is recorded, then the child voice gateway performs a call setup (step S36). If it is not recorded, then the child voice gateway sends out the destination inquiring message (step S33). When receiving a destination determination message (step S34), the child voice gateway records a transport address and steering number of the destination in the route selection table 153 (step S35) and then performs a call setup (step S36). The above-describe operations are performed by the declaration mechanism 134 and the inquiring mechanism 135 of the central control unit 130.

Figure 15:
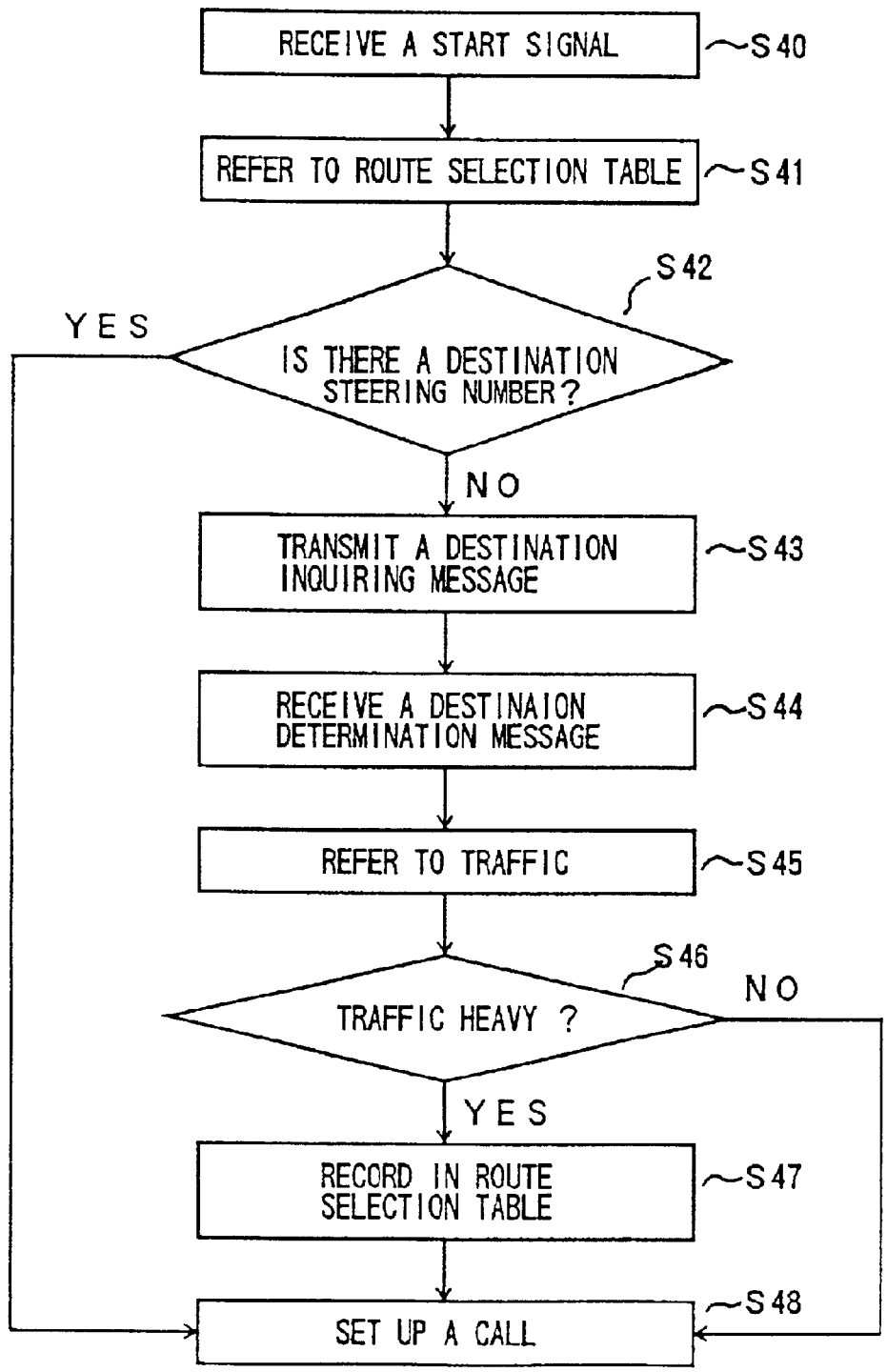
FIG. 15 is a flowchart of operations of the child voice gateway in a case of performing a call setup by using the route selection table, in a case of referring to traffic, according to the embodiment of the present invention shown by FIG. 2.

FIG. 15 is a flowchart of operations of the child voice gateway to refer to traffic when recording data in the route selection table 153.

After receiving the start signal (step S40), the child voice gateway refers to the route selection table 153 (step S41) and confirms whether or not the destination steering number is recorded in the route selection table 153 (step S42). If it is recorded, then the child voice gateway performs the call setup (step S48). If it is not recorded, then the child voice gateway sends out the destination inquiring message (step S43). After receiving the destination determination message (step S44), the child voice gateway refers to the traffic (step S45) and then confirms whether or not the traffic is heavy (step S46). If it is heavy, then the child voice gateway records the traffic (step S47) and then performs the call setup (step S48). If it is not heavy, then the child voice gateway performs the call setup (step S48) without recording the traffic. The above-described operations are performed by the declaration mechanism 134, the inquiring mechanism 135 and a traffic referring mechanism 138 of the central control unit 130.

Figure 16:
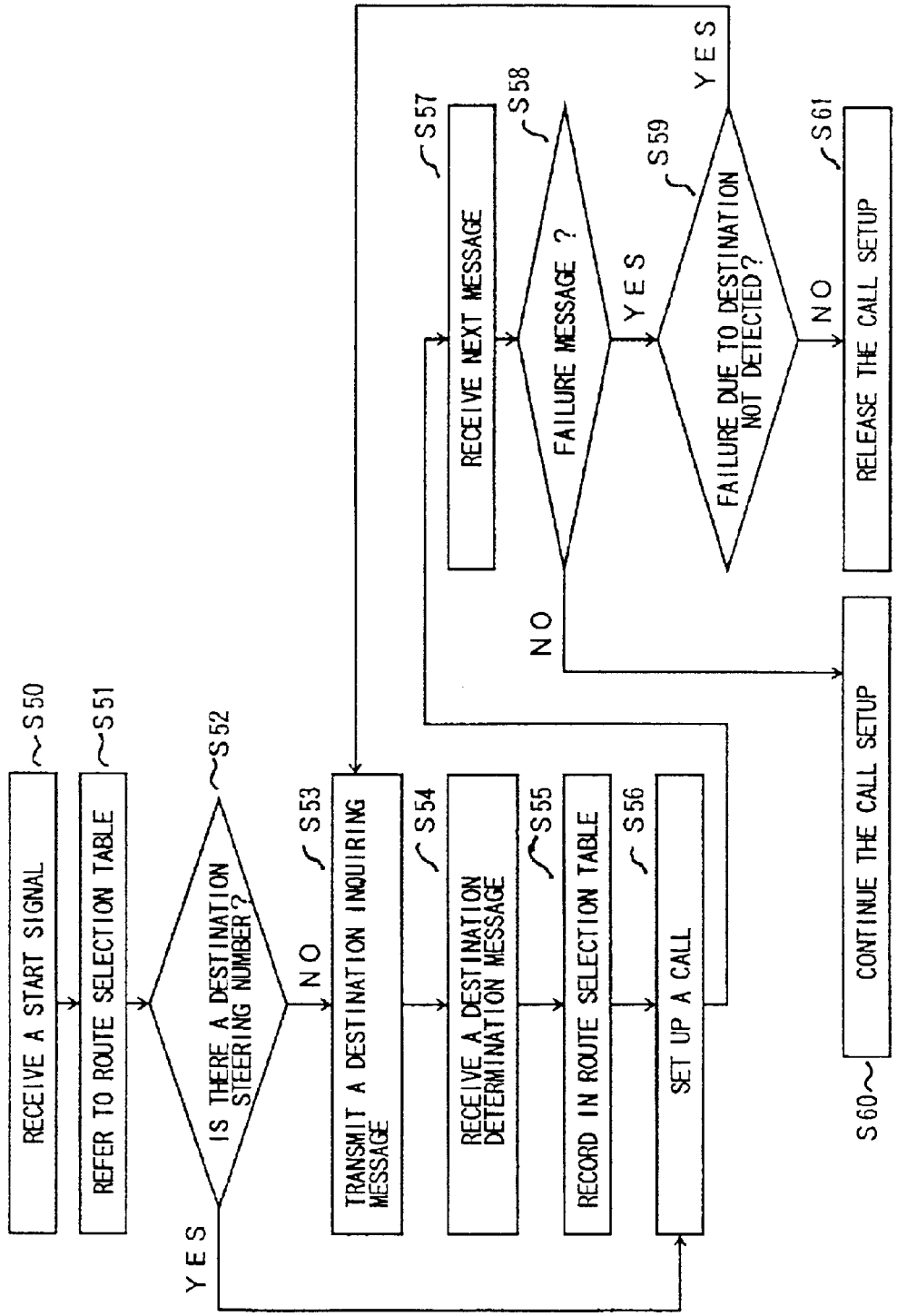
FIG. 16 is a flowchart of operations of the child voice gateway in a case of failing to set up a call according to the embodiment of the present invention shown by FIG. 2.

FIG. 16 is a flowchart illustrating a case where a child voice gateway performs a call setup but fails to set up the call according to the route selection table 153.

Herein, since steps S50 to S56 for setting up a call are identical with those described in FIG. 14, a description thereof is omitted.

After receiving a message after the call setup (step S57) the child voice gateway 64 confirms whether or not the after-call-setup message is a message of failing to set up the call (step S58). If the after-call-setup message is the failure message, then the child voice gateway 64 investigates whether or not the failure is due to a destination not being detected (step S59). If YES, then the child voice gateway 64 sends out the destination inquiring message (step S53); if NO, then the child voice gateway 64 releases the call (step S61). If the after-call-setup message is not the failure message, then the child voice gateway 64 continues to set up the call (step S60). The previously described operations are performed by the declaration mechanism 134 and the inquiring mechanism 135 of the central control unit 130.

Figure 17:
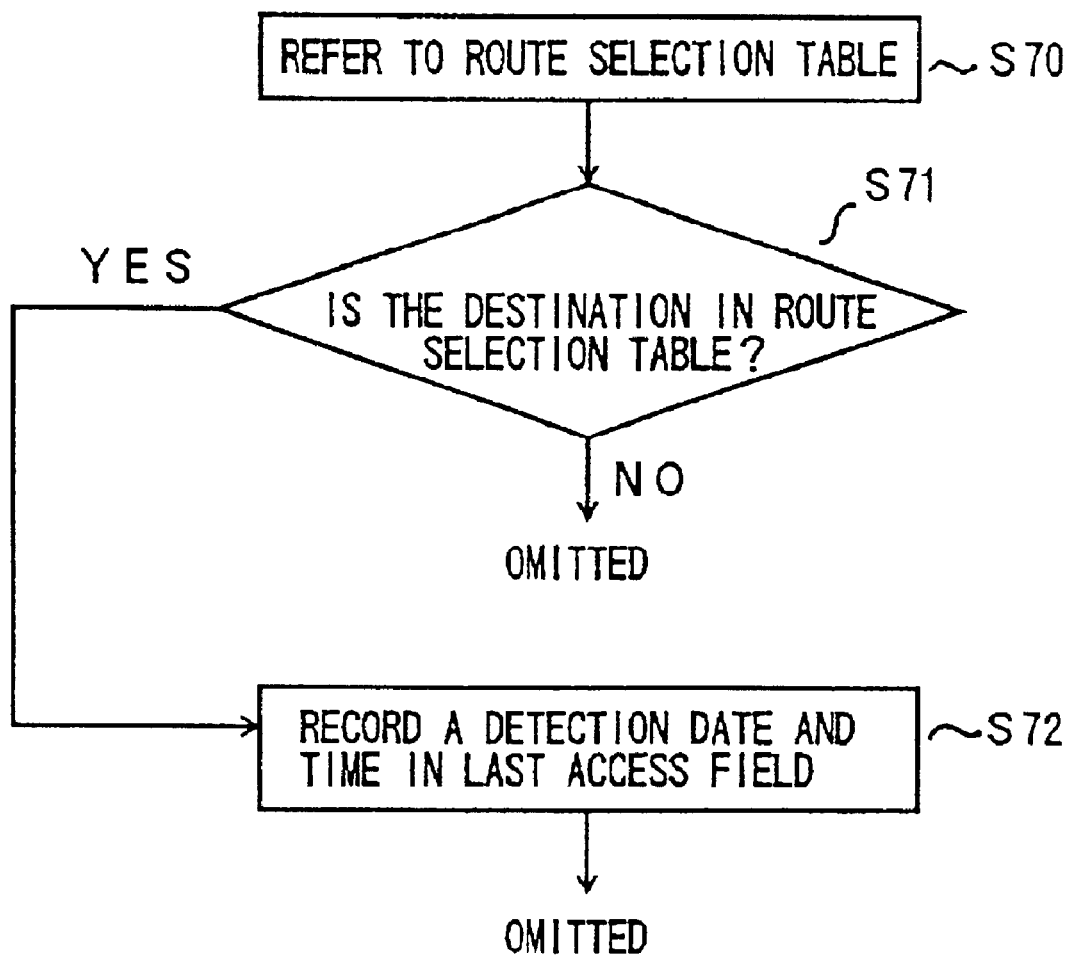
FIG. 17 is a flowchart of operations of the child voice gateway in a case of recording a date and time on a last access field of the route selection table according to the embodiment of the present invention shown by FIG. 2.

FIG. 17 is a flowchart of operations of the child voice gateway to record a detection time in the last access field shown in FIG. 8 in a case where the child voice gateway deletes the transport address and the corresponding steering number from the route selection table 153 if the transport address is not referred to during a predetermined period.

The child voice gateway refers to the route selection table 153 in order to send out the destination inquiring message (step S70), and then confirms whether or not the destination is detected in the route selection table (step S71). If it is detected, then the child voice gateway records the detection date and time in the last access field (step S72). The last access field is periodically monitored by a route-selection-table monitoring mechanism 136 of the central control unit 130, and is deleted from the route selection table 153 if the monitoring mechanism 136 detects that the last access field is not referred to during the predetermined period.

Figure 18:
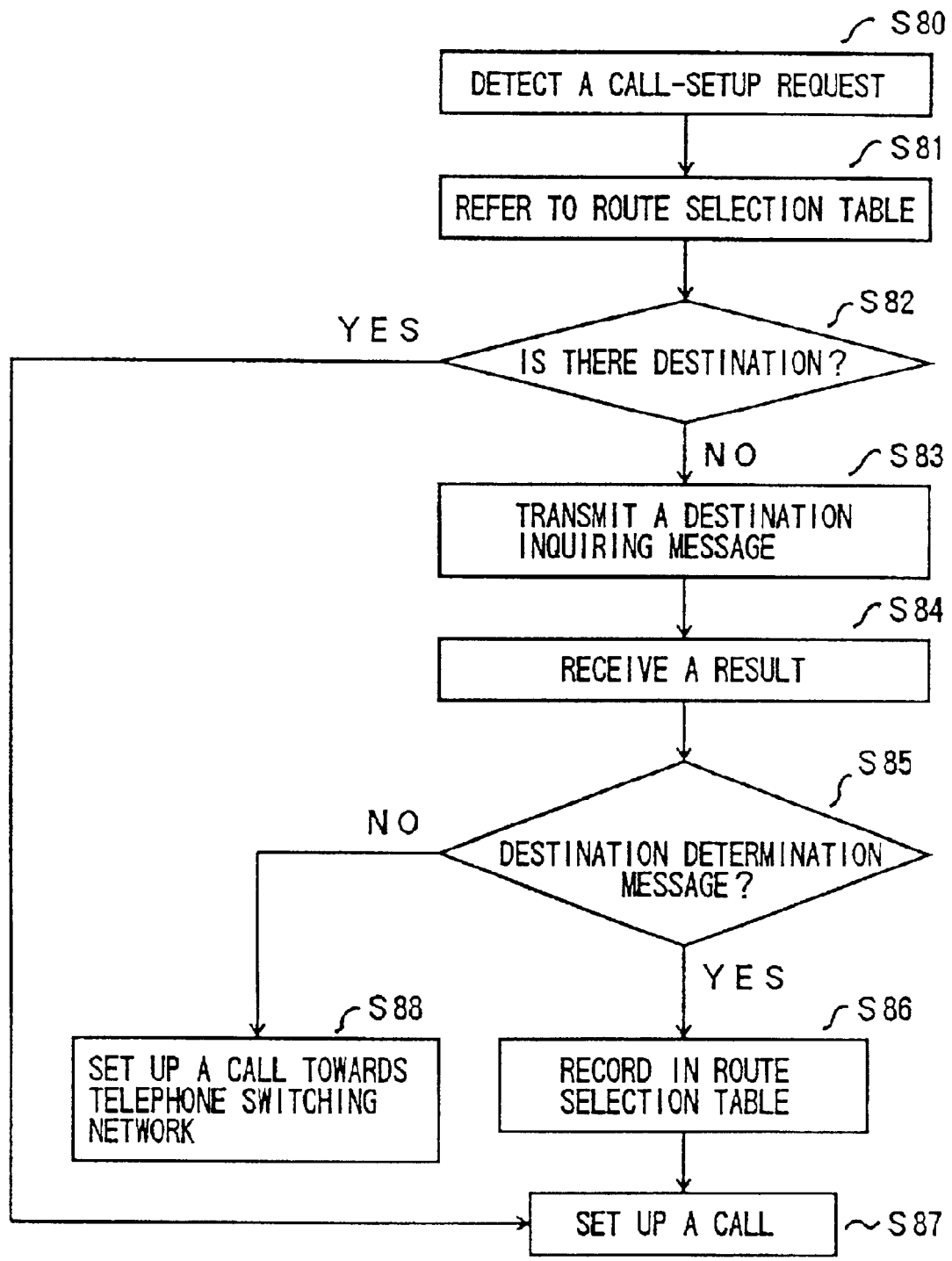
FIG. 18 is a flowchart of operations of the child voice gateway in a case of failing to set up a call via an IP network and starting the call setup again via a telephone switching network according to the embodiment of the present invention shown by FIG. 2.

FIG. 18 a flowchart of operations of the child voice gateway in a case of failing to transmit the destination inquiring message to the parent voice gateway.

In this diagram after detecting a call-setup request (step S80), the child voice gateway refers to the route selection table 153 (step S81) and then confirms whether or not the destination is detected in the route selection table 153 (step S82). If it is detected, then the child voice gateway performs the call setup (step S87). If it is not detected, then the child voice gateway sends out the destination inquiring message (step S83). After receiving a result of the destination inquiring message (step S84), the child voice gateway investigates the result (step S85). If the result is a destination determination message, then the child voice gateway records the result on the route selection table 153 (step S86); if not, the child voice gateway performs a call setup towards the telephone switching network 10 (step S88). The above-described operations are performed by the inquiring mechanism 135, the declaration mechanism 134, and a routing mechanism 139 for the telephone switching network of the central control unit 130.

Next, a description will be given with respect to a case where the local transport address 151 or the local steering number 152 of the child voice gateway is changed.

For example, when the local steering number 152 held in the memory unit 150 of the child voice gateway 64 is changed from "722" to "721" by the system operator, the changed local steering number makes an update flag "TRUE" as shown by a table (b) of FIG. 19. A local information monitoring mechanism 137 for periodically monitoring the flag detects that the flag becomes "TRUE" and then notifies the declaration mechanism 134 of the detection. The declaration mechanism 134 refers to a declaration table 154 stored in the memory unit 150 (see FIG. 3) and then transmits a declaration message (including the declaration header, the steering number 721, and the transport address (IP address: 20. 20. 20. 2, port number: 8001)) towards the declaration destination transport address (IP address: 20. 20. 20. 1, port number: 8001). The transmission route is identical with that of S7 shown in FIG. 5.

Next, a description will be given of constitutions and operations of the parent voice gateways 60 and 62 in the previously described embodiment of FIG. 2.

Figure 11:
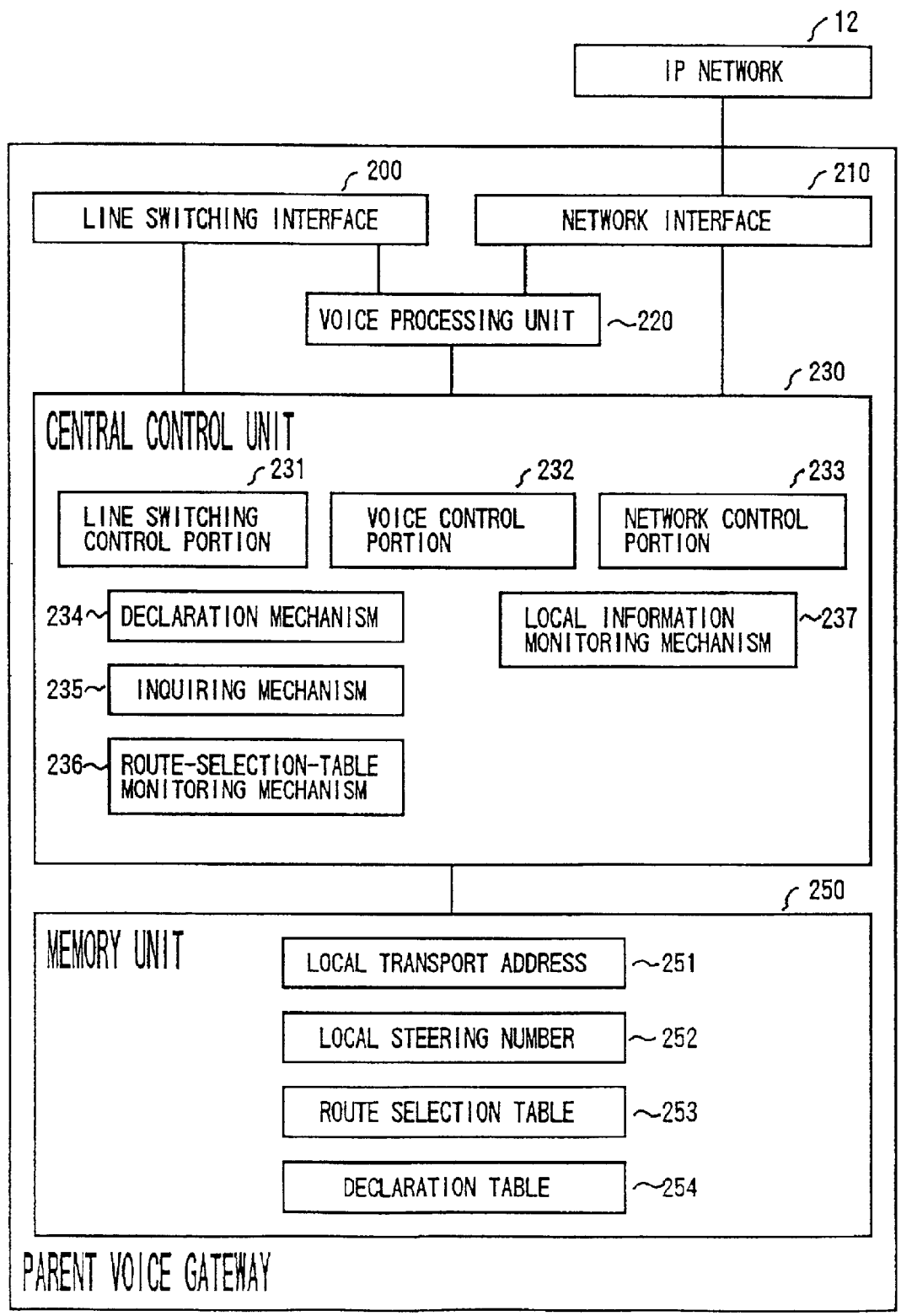
FIG. 11 is a block diagram of the parent voice gateway according to the embodiment of the present invention shown by FIG. 2.

Firstly, FIG. 11 is a block diagram illustrating the constitutions of the parent voice gateways 60 and 62. As shown in this diagram, the parent voice gateways 60 and 62 each comprise a central control unit 230, a memory unit 250, a voice processing unit 220, a line switching interface 200, and a network interface 210. Herein, the central control unit 230 is connected to the memory unit 250, the voice processing unit 220, the line switching interface 200 and the network interface 210. The line switching interface 200 and the network interface 210 are connected to the voice processing unit 220. The network interface 210 is connected to the IP network 12.

Figure 20:
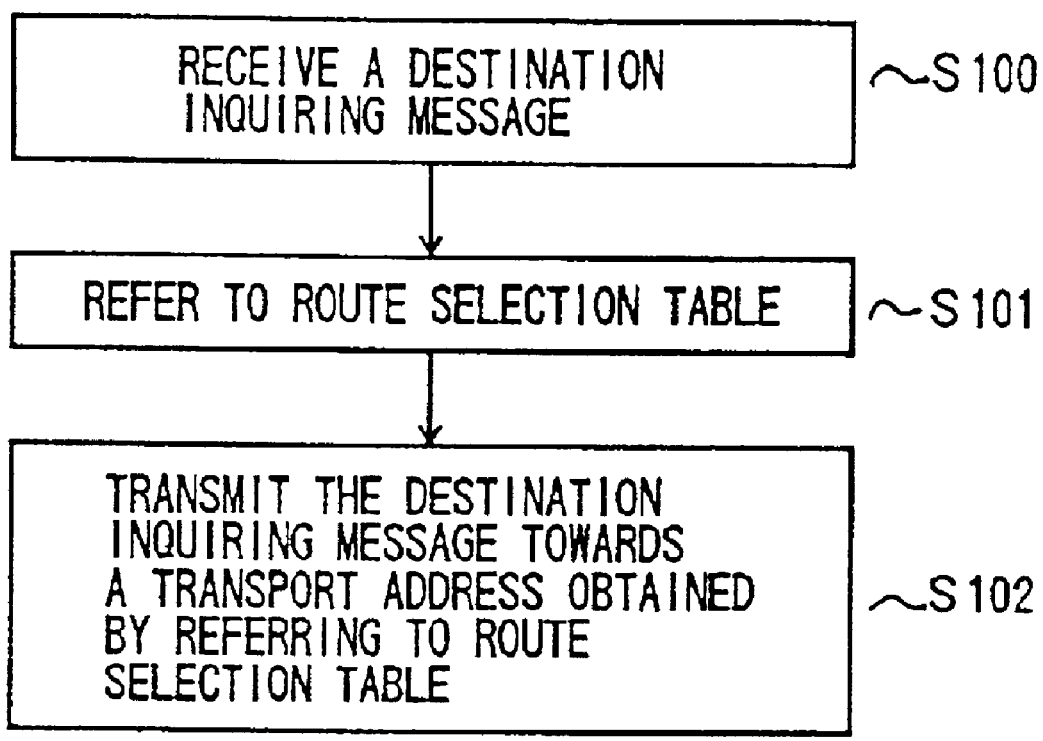
FIG. 20 is a flowchart of operations of the parent voice gateway to receive the destination inquiring message according to the embodiment of the present invention shown by FIG. 2.

Secondly, FIG. 20 is a flowchart of the parent voice gateway to receive the destination inquiring message from the child voice gateway. When receiving the destination inquiring message from the network interface 210 (step S100), the parent voice gateway refers to the route selection table 253 (step S101) and then sends the destination inquiring message towards a transport address obtained from the route selection table 253 (step S102). These operations are performed by a declaration mechanism 234 and an inquiring mechanism 235 of the central control unit 230.

Also, the declaration mechanism 234 of the central control unit 230 functions to declare a local transport address 251 or a local steering number 252 of the parent voice gateway to the other parent voice gateways as well as to receive declaration messages from the other parent voice gateways or from the other child voice gateways and then record these messages in the route selection table 253.

Returning to the previously described FIG. 17, this diagram can also be used to show a flowchart of operations of the parent voice gateway to record a detection date and time on the last access field of FIG. 8, with respect to the parent voice gateway deleting the transport address and the corresponding steering number from the route selection table 253 in a case where the transport address is not referred to during the predetermined period.

The parent voice gateway refers to the route selection table 253 in order to send out the destination inquiring message (step S70), and then confirms whether or not the destination is detected in the route selection table 253 (step S71). If it is detected, then the parent voice gateway records the detection date and time on the last access field (step S72). The last access field is periodically monitored by a route-selection-table monitoring mechanism 236 of the central control unit 230, and is deleted from the route selection table 253 if the monitoring mechanism 236 detects that the last access field is not referred to during the predetermined period.

Figure 21:
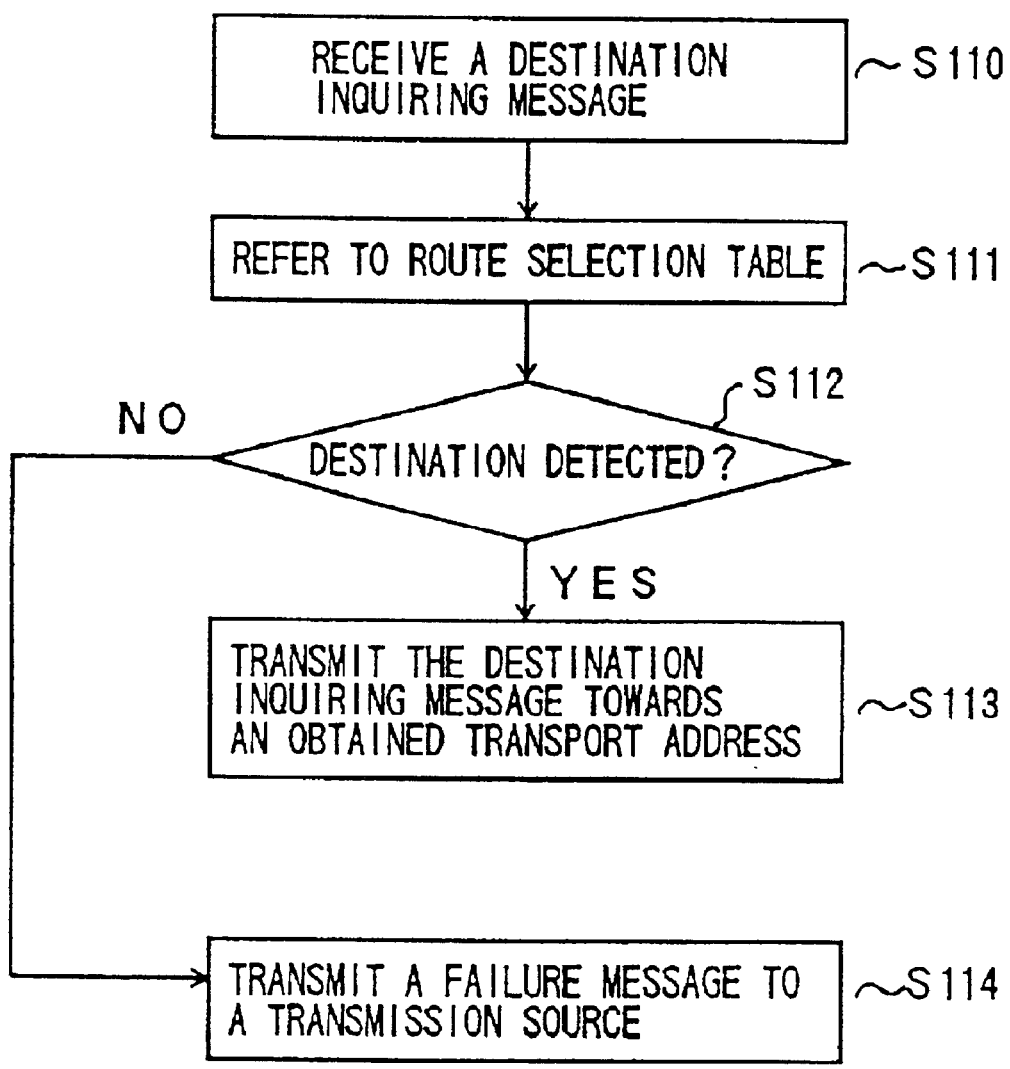
FIG. 21 is a flowchart of operations of the parent voice gateway in a case of failing to transmit the destination inquiring message according to the embodiment of the present invention shown by FIG. 2.

FIG. 21 is a flowchart of the parent voice gateway in a case of failing to transmit the destination inquiring message. The detailed example has been described by FIG. 9.

After receiving the destination inquiring message (step S110) the parent voice gateway refers to the route selection table 235 (step S111) and then confirms whether or not the destination is detected in the route selection table 253 (step S112). If the destination is detected, then the parent voice gateway sends out the destination determination message (step S113); if not, the parent voice gateway transmits the failure message towards the child voice gateway (step S114). These operations are performed by the declaration mechanism 234 and inquiring mechanism 235 of the central control unit 230.

Herein, operations in a case where the local transport address 251 or the local steering number 252 of the parent voice gateway is changed are similar to those of the previously described child voice gateway, and a description thereof is omitted.

Next, a description will be given with respect to the memory units 150 and 250 for recording control programs of the voice gateways according to the present invention.

Firstly, the memory unit 150 as a memory medium functions to store programs for actuating the central control unit 130. By installing the programs of the present invention into the existing voice gateways, the existing voice gateways can function as those of the present invention. The memory unit 150 as such a memory medium for storing the programs may be, for example, an electronic memory, a hard disk, an optical magnetic memory, a disk tape, or the like.

Secondly, the memory unit 250 as the memory medium functions to store programs for actuating the central control unit 230. By installing the programs of the present invention into the existing voice gateways, the existing voice gateways can function as those of the present invention. The memory unit 250 as the memory medium for storing the programs may be, for example, an electronic memory, a hard disk, an optical magnetic memory, a disk tape, or the like.

The above description is provided in order to enable any person skilled in the art to make and use the invention and sets forth the best mode contemplated by the inventions of carrying out their invention.

The present invention is not limited to the specifically disclosed embodiment, and variations and modifications may be made without departing from the scope of the present invention.

For example, FIG. 5 shows a case where a signal for a call setup is transmitted from the telephone terminal 74 connected to the telephone switching office 70. In practice, the call setup can be performed by the previously described method in a case where the call setup signal is transmitted from any telephone terminal connected to any switching office within the telephone switching network 10 or connected to the child voice gateway 64. Further, the child voice gateway and the parent voice gateway may be combined into one voice gateway, and a plurality of the voice gateways and a plurality of the switching offices may be connected with each other. The IP network 12 may be the Internet or a leased TCP/IP network. The telephone switching network 10 may be a public telephone switching network or a leased network.

The present application is based on Japanese priority application No. 10-250092 filed on Sep. 3, 1998, the entire contents of which are hereby incorporated for reference.

What is claimed is:

1. A route selection method for a voice communication system, which system comprises:

a plurality of networks including IP networks; and a plurality of voice gateways, interconnecting said IP networks with the other networks for voice communication, said voice gateways being hierarchically divided into first voice gateways for accommodating nodes of said networks other than the IP networks, and second voice gateways for delivering information about the route selection;

said method comprising the steps of:

(a) controlling each of said second voice gateways to hold a route selection table indicating a correspondence between steering numbers and transport addresses for identifying routes in the IP network;

(b) controlling one of said first voice gateways as an originating voice gateway to transmit a destination inquiring message, including a transport address of said originating voice gateway and a destination office number, to a predetermined one of said second voice gateways in which said destination inquiring message is collated with said route selection table thereof and is forwarded towards one of said first voice gateways as a destination voice gateway; and (c) controlling said destination voice gateway to transmit a destination determination message including a transport address of said destination voice gateway to said originating voice gateway;

wherein said step (a) further includes a step of controlling one of said first voice gateways, in a predetermined case, to transmit a steering number and a transport address thereof to one of said second voice gateways, and wherein said one first voice gateway of step b) transmits said destination inquiring message to an address for said predetermined second voice gateway that is recorded in a declaration table of said one first voice gateway, said address for said predetermined second voice gateway being determined independently of the destination office number of the destination inquiring message.

2. The route selection method as claimed in claim 1, further comprising a step of:

(d) controlling said originating voice gateway, after receiving said destination determination message, to record a destination transport address and a destination steering number, which are included in said destination determination message, in a route selection table thereof, said route selection table indicating a correspondence between said destination transport address and said destination steering number.

3. A route selection method for a voice communication system, which system comprises:

a plurality of networks including IP networks; and a plurality of voice gateways, interconnecting said IP networks with the other networks for voice communication, said voice gateways being hierarchically divided into first voice gateways for accommodating nodes of said networks other than the IP networks, and second voice gateways for delivering information about the route selection;

said method comprising the steps of:

(a) controlling each of said second voice gateways to hold a route selection table indicating a correspondence between steering numbers and transport addresses for identifying routes in the IP network;

(b) controlling one of said first voice gateways as an originating voice gateway to transmit a destination inquiring message, including a transport address of said originating voice gateway and a destination office number, to a predetermined one of said second voice gateways in which said destination inquiring message is collated with said route selection table thereof and is forwarded towards one of said first voice gateways as a destination voice gateway; and (c) controlling said destination voice gateway to transmit a destination determination message including a transport address of said destination voice gateway to said originating voice gateway, and further comprising a step of:

(e) controlling said originating voice gateway, after receiving said destination determination message, to refer to traffic between said originating voice gateway and said destination voice gateway, and then only when said traffic meets a predetermined traffic requirement, record a destination transport address and a destination steering number which are included in said destination determination message in a route selection table thereof, said route selection table indicating a correspondence between said destination transport address and said destination steering number;

wherein said one first voice gateway of step b) transmits said destination inquiring message to an address for said predetermined second voice gateway that is recorded in a declaration table of said one first voice gateway, said address for said predetermined second voice gateway being determined independently of the destination office number of the destination inquiring message.

4. The route selection method as claimed in claim 2, further comprising a step of:

(f) controlling said originating voice gateway, in a case of failing to set up a call towards said transport address recorded in said route selection table thereof, to transmit said destination inquiring message to said predetermined second voice gateway.

5. The route selection method as claimed in claim 1, further comprising a step of:

(g) deleting said transport address and said steering number from said route selection table, if said transport address recorded on said route selection table is not referred to during a predetermined period.

6. The route selection method as claimed in claim 1, further comprising a step of:

(h) controlling said second voice gateway, in a case of failing to deliver said route selection information, to transmit a failure message to said originating voice gateway, so that said originating voice gateway selects the network other than the IP networks to set up the call.

7. The route selection method as claimed in claim 1, further comprising a step of:

(i) notifying said second voice gateway, when said steering number or said transport address of said voice gateway is changed, of said changed steering number or said changed transport address.

8. A voice gateway interconnecting IP networks with other networks for voice communication, said voice gateway comprising:

a call-setup part which after detecting a call-setup request from one of said other networks, transmits a destination inquiring message to a predetermined voice gateway, and after receiving a destination determination message from a destination voice gateway, performs a call setup towards a destination transport address included in said destination determination message from said destination voice gateway;

wherein said destination inquiring message includes a destination number and a transport address of said voice gateway; and wherein said predetermined voice gateway holds a route selection table, collates the destination number of said destination inquiring message with steering numbers in said route selection table to select a corresponding steering number, selects a transport address from the route selection table based on the selected steering number, and forwards said destination inquiring message toward a next voice gateway addressed by the selected transport address, wherein said next voice gateway is one of a) the destination voice gateway and b) another voice gateway having address information for the destination voice gateway; and wherein said voice gateway transmits said destination inquiring message to an address for said predetermined voice gateway that is recorded in a declaration table of said voice gateway, said address for said predetermined gateway being determined independently of the destination number of the destination inquiring message.

9. A voice gateway interconnecting IP networks with other networks for voice communication, said voice gateway comprising:

a call-setup part which after detecting a call-setup request from one of said other networks, transmits a destination inquiring message to a predetermined voice gateway, and after receiving a destination determination message from a destination voice gateway, performs a call setup towards a destination transport address included in said destination determination message from said destination voice gateway; and a recording part which records a destination transport address and a destination steering number of said destination voice gateway, which are included in said destination determination message, in a route selection table thereof, said route selection table indicating a correspondence between said destination transport address and said destination steering number of said destination voice gateway;

wherein said predetermined voice gateway holds a route selection table, compares said destination inquiring message with said route selection table, determines a route to said destination voice gateway and forwards said destination inquiring message toward said destination voice gateway;

wherein said voice gateway transmits said destination inquiring message to an address for said predetermined voice gateway that is recorded in a declaration table of said voice gateway, said address for said predetermined gateway being determined independently of the destination transport number of the destination inquiring message.

10. A voice gateway interconnecting IP networks with other networks for voice communication, said voice gateway comprising:

a call-setup part which after detecting a call-setup request from one of said other networks, transmits a destination inquiring message to a predetermined voice gateway, and after receiving a destination determination message from a destination voice gateway, performs a call setup towards a destination transport address included in said destination determination message from said destination voice gateway; and a recording part which, after receiving said destination determination message from said destination voice gateway, refers to traffic between said voice gateway and said destination voice gateway, and, only when said traffic meets a predetermined traffic requirement, records said destination transport address and a destination steering number of said destination voice gateway in a route selection table thereof, said route selection table indicating a correspondence between said destination transport address and said destination steering number of said destination voice gateway;

wherein said voice gateway transmits said destination inquiring message to an address for said predetermined voice gateway that is recorded in a declaration table of said voice gateway said address for said predetermined gateway being determined independently of the destination transport number of the destination inquiring message, and wherein said predetermined voice gateway holds a route selection table, compares said destination inquiring message with said route selection table, determines a route to said destination voice gateway and forwards said destination inquiring message toward said destination voice gateway.

11. The voice gateway as claimed in claim 9, said call-setup part comprising:
a quick-call-setup part, which after detecting said call-setup request, refers to said route selection table so as to obtain said destination transport address, and then performs said call setup towards said destination transport address; and
a transmitting part which, in a case of said quick-call-setup part failing to perform said call setup towards said destination transport address, transmits said destination inquiring message to said predetermined voice gateway.

12. The voice gateway as claimed in claim 9, further comprising:
a deleting part which deletes said destination transport address and said corresponding destination steering number from said route selection table if said destination transport address recorded on said route selection table is not referred to during a predetermined period.

13. The voice gateway as claimed in claim 8, further comprising:
a receiving part which receives a failure message in a case where said destination inquiring message has been transmitted to said predetermined voice gateway but said destination cannot be detected and
an alternate-call-setup part which selects a network other than one of the IP networks to perform said call setup when said failure message is received.

14. A voice gateway interconnecting IP networks with other networks for voice communication, said voice gateway comprising:
a call-setup part which after detecting a call-setup request from one of said other networks, transmits a destination inquiring message to a predetermined voice gateway, and after receiving a destination determination message from a destination voice gateway, performs a call setup towards a destination transport address included in said destination determination message from said destination voice gateway; and
a notifying part which, when a steering number and a transport address of said destination voice gateway are changed, notifies said predetermined voice gateway of said changed steering number and said changed transport address;
wherein said voice gateway transmits said destination inquiring message to an address for said predetermined voice gateway that is recorded in a declaration table of said voice gateway, said address for said predetermined gateway being determined independently of the destination transport number of the destination inquiring message, and wherein said predetermined voice gateway holds a route selection table, compares said destination inquiring message with said route selection table, determines a route to said destination voice gateway and forwards said destination inquiring message toward said destination voice gateway.

15. A voice gateway interconnecting IP networks and other networks for voice communication, said voice gateway comprising:
a transmitting part which, after receiving a destination inquiring message, refers to a route selection table thereof, which route selection table indicates a correspondence between steering numbers and transport addresses, and then transmits said destination inquiring message towards a transport address obtained by referring to said route selection table for forwarding said destination inquiring message toward a destination voice gateway,
wherein said destination voice gateway receives said destination inquiring message from an originating voice gateway, and said destination voice gateway sends a destination determination message including a destination transport address and a destination steering number to said originating voice gateway, and wherein said originating voice gateway transmits said destination inquiring message to an address for said voice gateway that is recorded in a declaration table of said originating voice gateway, said address for said voice gateway being determined independently of the destination transport number of the destination inquiring message.

16. The voice gateway as claimed in claim 15, further comprising:
a transmitting part which, in a predetermined case, transmits a steering number and a transport address to a predetermined voice gateway; and
a recording part which, after receiving a steering number and a transport address from another voice gateway in said predetermined case, records said received steering number and said received transport address in said route selection table thereof.

17. The voice gateway as claimed in claim 15, further comprising:
a deleting part which deletes said transport address and said corresponding steering number from said route selection table if said transport address recorded in said route selection table in not referred to during a predetermined period.

18. The voice gateway as claimed in claim 15, further comprising:
a failure-message transmitting part which transmits a failure message to an originating voice gateway which has transmitted said destination inquiring message, in a case where said destination cannot be detected even though said destination inquiring message has been received and said route selection table has been referred to.

19. The voice gateway as claimed in claim 15, further comprising:
a notifying part which, when said steering number and said transport address are changed, notifies a predetermined voice gateway of said changed steering number and said changed transport address; and
a recording part which receives a steering number and a transport address from another voice gateway and records said steering number and said transport address in said route selection table.

20. A computer readable medium storing program code for controlling a voice gateway interconnecting IP networks and other networks for voice communication, said voice gateway comprising:
program code means for, after said voice gateway receives a destination inquiring message, controlling said voice gateway to refer to a route selection table indicating a correspondence between steering numbers and transport addresses, and then transmit said destination inquiring message towards a transport address obtained by referring to said route selection table for forwarding said destination inquiring message toward a destination voice gateway, wherein said voice gateway receives said destination inquiring message from an originating voice gateway and said destination voice gateway sends a destination determination message including a destination transport address and a destination steering number to said originating voice gateway, and wherein said originating voice gateway transmits said destination inquiring message to said voice gateway by means of an address for said voice gateway that is recorded in a declaration table of said originating voice gateway, said address for said voice gateway being determined independently of the destination transport number of the destination inquiring message.

21. A route selection method for voice gateways which are hierarchically divided into first voice gateways for accommodating nodes of networks other than IP networks, and second voice gateways for transferring information about a route selection, said method comprising the steps of:

(a) controlling each of said second voice gateways to hold a route selection table indicating a correspondence between steering numbers and transport addresses for identifying routes on the IP network;

(b) controlling one of said first voice gateways as an originating voice gateway to transmit a destination inquiring message, including a transport address of said originating voice gateway and a destination office number, to a predetermined one of said second voice gateways in which said destination inquiring message is collated with said route selection table thereof and is forwarded towards one of said first voice gateways as a destination voice gateway; and (c) controlling said destination voice gateway to transmit a destination determination message including a transport address of said destination voice gateway to said originating voice gateway, wherein said step (a) further includes a step of controlling one of said first voice gateways, in a predetermined case, to transmit a steering number and a transport address thereof to one of said second voice gateways, and wherein step b) further includes the step of controlling said one first voice gateway to transmit said destination inquiring message to an address for said predetermined second voice gateway that is recorded in a declaration table of said one first voice gateway, said address for said predetermined second voice gateway being determined independently of the destination office number of the destination inquiring message.

\* \* \* \* \*